US007526793B2

(12) United States Patent
Andreev et al.

(10) Patent No.: US 7,526,793 B2
(45) Date of Patent: Apr. 28, 2009

(54) METHOD FOR AUTHENTICATING DATABASE CONNECTIONS IN A MULTI-TIER ENVIRONMENT

(75) Inventors: Dmitry Andreev, Port Chester, NY (US); Galina Grunin, Briarcliff Manor, NY (US); Gregory Vishansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 11/011,845

(22) Filed: Dec. 14, 2004

(65) Prior Publication Data
US 2006/0130123 A1 Jun. 15, 2006

(51) Int. Cl.
*G06F 7/04* (2006.01)
*G06F 15/16* (2006.01)
*G06K 9/00* (2006.01)
*H04L 9/32* (2006.01)
*H04L 9/00* (2006.01)

(52) U.S. Cl. ............................. 726/2; 713/153; 709/229
(58) Field of Classification Search ................. 726/2–5; 713/153
See application file for complete search history.

(56) References Cited
U.S. PATENT DOCUMENTS

| 6,052,785 | A | 4/2000 | Lin et al. ..................... 713/201 |
|---|---|---|---|
| 6,209,029 | B1 * | 3/2001 | Epstein et al. ............... 709/219 |
| 6,275,941 | B1 * | 8/2001 | Saito et al. ...................... 726/2 |
| 6,286,104 | B1 * | 9/2001 | Buhle et al. ..................... 726/4 |
| 6,367,009 | B1 | 4/2002 | Davis et al. .................. 713/166 |
| 6,516,416 | B2 * | 2/2003 | Gregg et al. ..................... 726/8 |
| 6,678,733 | B1 | 1/2004 | Brown et al. ................. 709/229 |
| 6,944,788 | B2 * | 9/2005 | Dinker et al. ................... 714/4 |
| 2004/0078569 | A1 | 4/2004 | Hotti ........................... 713/165 |
| 2004/0107342 | A1 * | 6/2004 | Pham et al. .................. 713/165 |
| 2005/0075115 | A1 * | 4/2005 | Corneille et al. .......... 455/456.3 |
| 2005/0278384 | A1 * | 12/2005 | Lin et al. ..................... 707/200 |
| 2007/0118732 | A1 * | 5/2007 | Whitmore ................... 713/155 |

OTHER PUBLICATIONS

Oracle, "Oracle Security Overview, 10g Release 1 (10.1)," Chapter 9, Oracle Security Products and Features [online], 2003, Oracle. [retrieved on Dec. 16, 2008]. Retrieved from the Internet: <URL: http://support.cs.nott.ac.uk/help/docs/databases/oracle/standard/network.101/b10777/galsyste,htm>.*

* cited by examiner

*Primary Examiner*—Emmanuel L Moise
*Assistant Examiner*—Luu Pham
(74) *Attorney, Agent, or Firm*—John R. Pivnichny; Law Office of Jim Boice

(57) ABSTRACT

Method, system, and product for authenticating database connections between a database server box having a database server and a database gateway; and an application server box having an application server and a connection authenticator. The application server and the connection authenticator are connected to the database server over an IP network. A TCP connection is established from the database gateway to the connection authenticator. The authenticator authenticates the application server and permits routing database requests and responses to and from the database server.

16 Claims, 3 Drawing Sheets

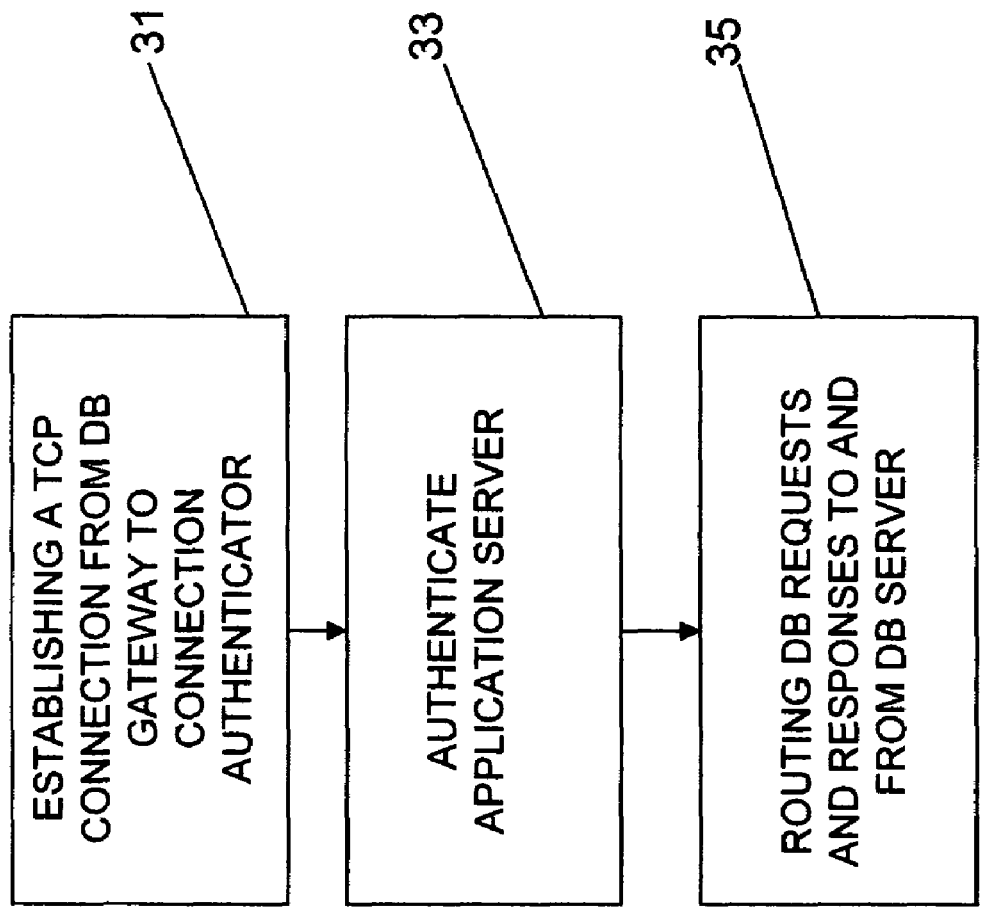

METHOD FOR AUTHENTICATING DATABASE CONNECTIONS IN A MULTI-TIER ENVIRONMENT

BACKGROUND

1. Field of the Invention

The invention pertains in general to security of distributed systems, and more particularly to systems and methods for authenticating and authorizing users, e.g., applications, to access other applications and resources within the distributed system.

2. Background of the Invention

In a typical multi-tier application architecture with a front end firewall, one or more application servers, a data tier firewall, and one or more database servers, the connections to the database server or servers normally originate from the application server or servers. Prior art password based database access authentication methods assumed that a decipherable image of the database access credentials were stored in persistent memory, and the persistent memory had to be accessible from the application server.

As a consequence, the database access credentials were relatively non-secure and could be acquired by an intruder who compromised the application tier security and thereby gained access to one or more of the application servers. Once this compromise occurs the intruder would then be able to request a database connection using the wrongfully acquired credentials. The intruder, with the wrongfully acquired credentials, will then be successfully authenticated by the database's security mechanism.

Thus, a clear need exists for a security system that does not rely on secreted security credentials stored in the database server that can be easily compromised from an application server.

SUMMARY OF THE INVENTION

The method, system, and product of our invention facilitate a security system that does not rely on security credentials stored in the database server. Removing this dependency on security credentials stored in the database server thwarts compromise of the security credentials.

The invention is embodied in a method, system, and product for authenticating a database connection in a multi-tier environment. The multi tier environment includes a database server box having a database server and a database gateway, and an application server box having an application server and a connection authenticator. The application server and the connection authenticator are connected to the database server over an IP network. The method, system, and product include the steps of establishing a TCP connection from a user application to the database gateway, and from the database gateway to the connection authenticator. To be noted is that a user application must first be authenticated to the database gateway, for example, by a password or the like. After the TCP connection is established from the database gateway to the connection authenticator, the application server is itself authenticated. After this authentication of the database gateway and user application as processes, the database requests and responses are routed to and from the database server.

The method establishes the TCP connection from the database gateway to the connection authenticator upon startup. Next, the application server is authenticated. Authentication of the application server as a process permits routing database requests and responses to and from the database server.

To be noted is that the database gateway is separate and distinct from the connection authenticator, and the TCP connection is established from the database gateway to the separate and distinct connection authenticator. The next step is authenticating the application server as a process.

BRIEF DESCRIPTION OF THE DRAWINGS

Various examples of the invention are illustrated in the FIGURES appended hereto.

FIG. 3 shows a flow chart representing the three steps of establishing a TCP connection from the database gateway to the connection authenticator; the application server; and routing database requests and responses to and from the database server.

DETAILED DESCRIPTION

Figure 1:
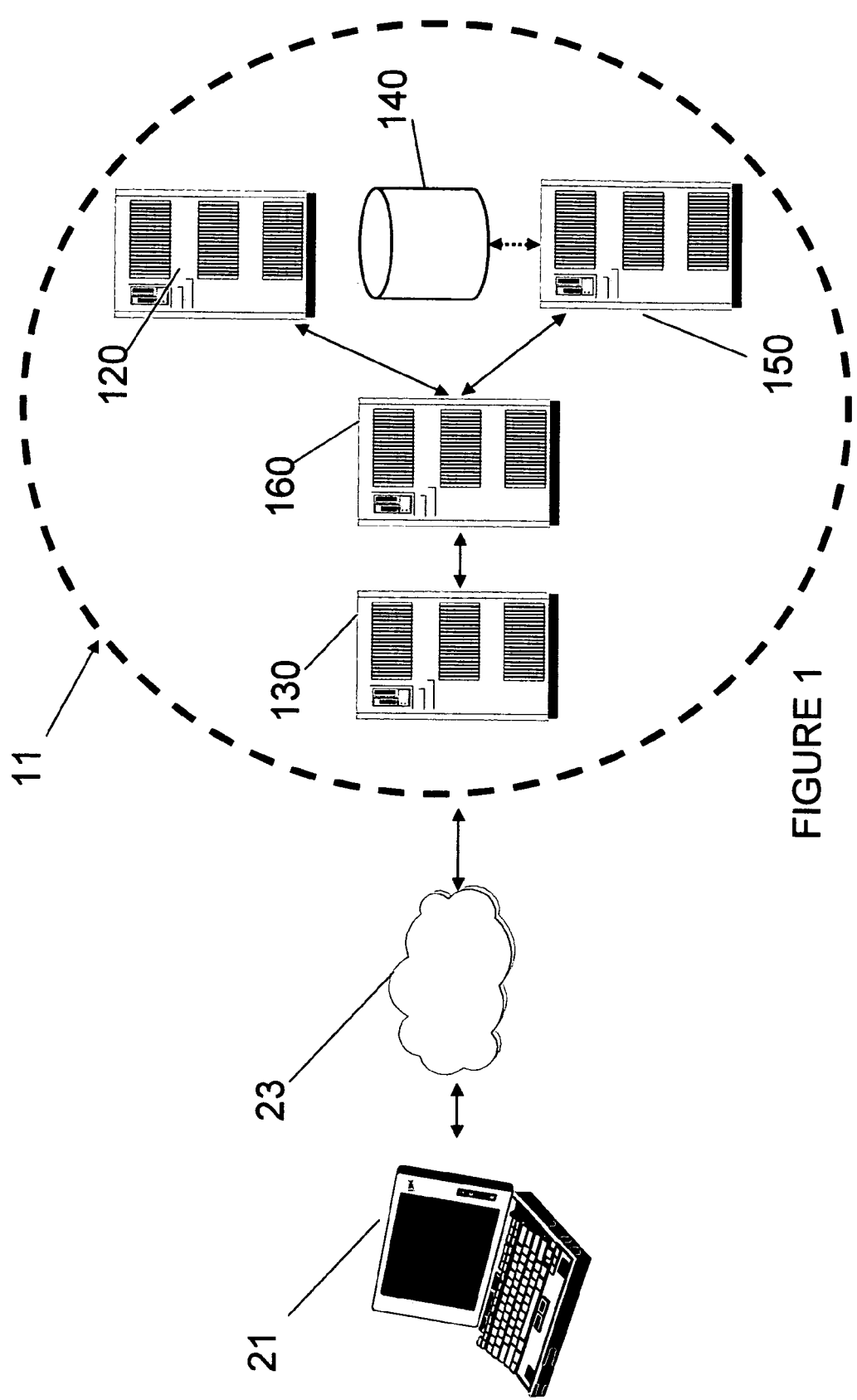
FIG. 1 is a high level illustration of a web connected 23 database system 11, with a web client 21 connected to the database system 11 through an internet 23. The system includes a database gateway 160, a connection authenticator 130, an application server 120, a file system 140, a database server 150, and a file server.

The method, system, and product described herein facilitate a method for authenticating a database connection in a multi-tier environment. The multi-tier environment includes a database server box or platform 110 having a database server 150 and a database gateway 160; and an application server box or platform 100 having an application server 120 and a connection authenticator 130. The application server 120 and the connection authenticator 130 are connected to the database server 150 over an IP network, over which connections 180 and 190 are established.

The method includes (after initiation by an end user, from a typically secure user application, represented by terminal 21) establishing a TCP connection from the database gateway 160 to the connection authenticator 130 through the link 190. The connection authenticator 130 authenticates the application server 120 as a process or application. Database requests and responses are then routed to and from the database server 170.

A TCP connection is established from the database gateway 160 to the connection authenticator 130 upon system startup. Once the TCP connection is established the application server 120 is authenticated as a process.

After startup and process authentication database requests and responses are routed to and from the database server 150.

As noted, the database gateway 160 is separate and distinct from the connection authenticator 130, and the TCP connection from the database gateway 160 to the separate and distinct connection authenticator 130. The application server 120 is authenticated as a process.

A trusted software component, shown as the Database Gateway 160, which may be running on the same physical server platform as the Database Server 150, is used to authenticate the software application running on the application server box or platform 100 that is requesting the database connection. This function is done through the Connection Authenticator 130. If the authentication is successful the database connection is granted to the requesting module.

FIG. 1 is a high level illustration of a web connected database system 11, with a web client 21 connected to the database system 11 through an internet 23. The system includes a database gateway 160, an application server 120, a file system 140, and a database server 150.

Figure 2:
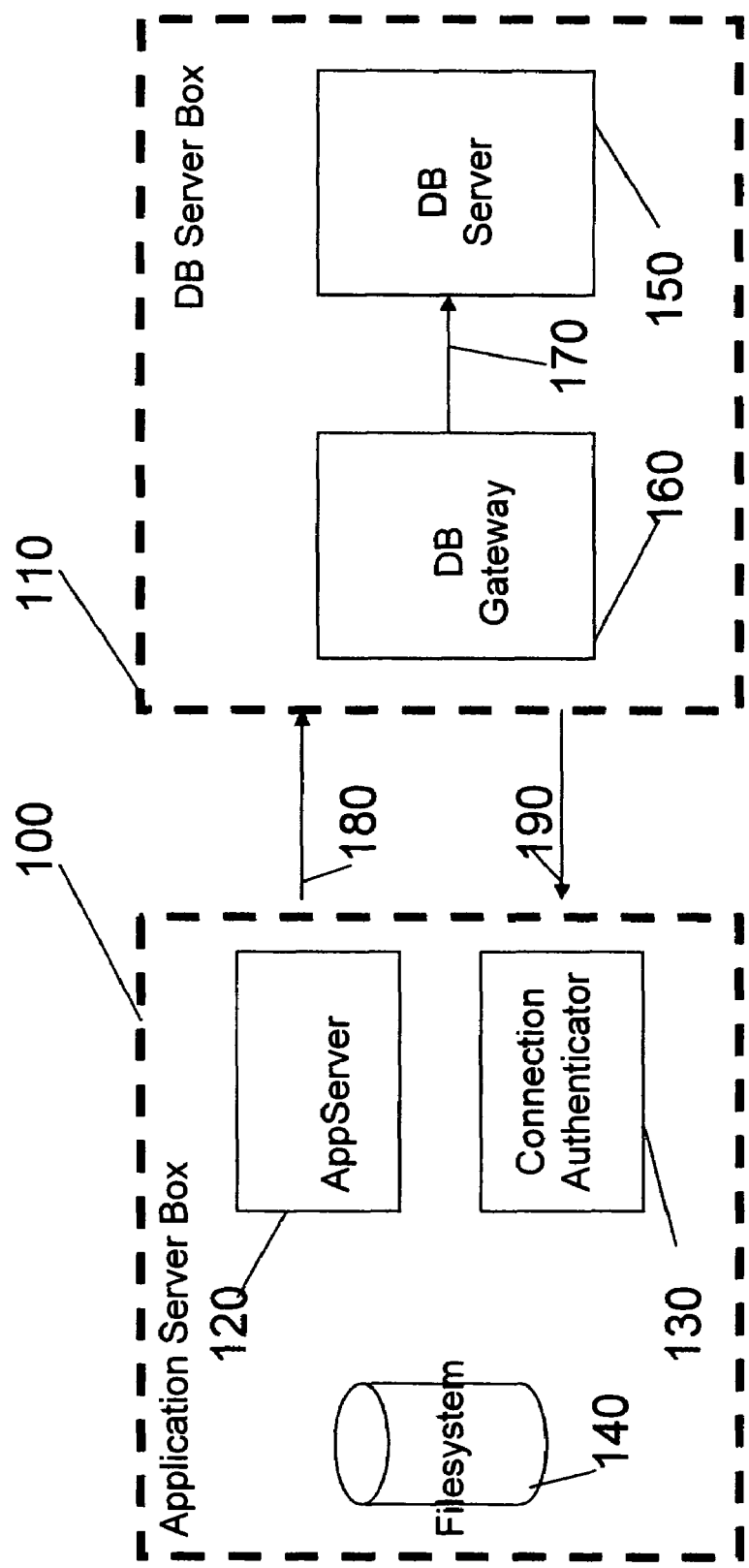
FIG. 2 is a more detailed view of the database system 11 of FIG. 1, showing an application server box 100 and a database server box 110. The application server box 100 includes application server 120, connection server 130, and filesystem 140. The database server box 110 includes the database server 150, the database gateway 160, a connection 170 between the database server 150 and the database gateway. The application server box 100 and the data base server box 110 are connected by links 180 and 190.

In the example shown in FIG. 2 is a more detailed view of the database system 11 of FIG. 1, showing an application server box 100 and a database server box 110. It is, of course, to be understood that the application server box 100 and the database server box 110 may be connected to the same IP subnetwork or to different IP subnetworks by a filtering router (firewall). The application server box 100 includes application server 120, connection server 130, and filesystem 140. The database server box 110 includes the database server 150, the database gateway 160, a connection 170 between the database server 150 and the database gateway. The application server box 100 and the data base server box 110 are connected by links 180 and 190.

According to the invention described herein, the Database Gateway 160 only accepts a TCP connection 180 originating from a predefined port number. This is clearly different from the prior art practice of using an automatic TCP port, e.g. randomly chosen from a specific range, usually 1024 to 5000, as the originating port for a client connection to the database server box 110 and the database server 150. Of course, it is to be understood that where there is a need to establish several database connections substantially simultaneously, a range or set of predefined port numbers can be used.

Since there can only be one process establishing a TCP connection from a given <source port, source IP> pair to a given <destination port, destination IP> pair, no other process can take over that TCP connection without alerting the server socket (TCP RST or FIN will be sent to the server socket when the original process terminates). The task of authenticating the software module that corresponds to the process which establishes the aforementioned TCP connect is accomplished by the Connection Authenticator 130.

Upon startup the Database Gateway 160 establishes a TCP connection 190 to a pre-defined TCP port on the Authentication Server Box 100 where the Connection Authenticator module 130 listens.

From that point on, every time the DB gateway 160 accepts an incoming TCP connection 180 from the Application Server 120, it authenticates the application server process before allowing the database requests and responses to be routed to and from the DB server 150.

FIG. 3 shows a flow chart representing the three steps of establishing a TCP connection from the database gateway to the connection authenticator block 31; authenticating the application server block 33; and routing database requests and responses to and from the database server block 35.

Specifically, the task of authenticating the Application Server process is entrusted to the Connection Authenticator 130. The Connection Authenticator 130 needs to verify that the process that has bound to the Outgoing TCP port had been originated from a predefined binary software module (i.e., a file), that the file had not been tampered with, and that the application server 120 was successful in binding to the outgoing TCP port.

Also, it is to be noted that a dedicated entity is responsible for client authentication, and not code credentials which have to be stored in a persistent memory where the code credentials are subject to attack and compromise. It is processes, and not users that are authenticated.

To ascertain that the process that has bound to the Outgoing TCP port had been originated from a predefined binary software module (i.e., a file), the Connection Authenticator 130 uses the underlying operating system services to match the running process with the file from which the process was started.

To ascertain that the file had not been tampered with, either the contents of the file or the hash of the contents of the file is compared with the corresponding binary image file stored at the Database Server 150.

To ascertain that the application server 120 was successful in binding to the outgoing TCP port, the Application Server 120 software module must be able to reply to status requests from the Connection Authenticator 130 several alternative methods and tools are useful for this task.

The authentication of the Connection Authentication 130 process itself takes place upon system startup, and gets performed by external means (e.g. a human operator) which are reasonably protected against being tampered with. As long as the TCP connection between the DB Gateway 160 and the Connection Authenticator 130 remains, there is certainty that the Connection Authenticator 130 has not been tampered with. If that TCP connection drops, the Connection Authenticator 130 process will need to be re-authenticated by external means.

Note that the Database Server 150 does not become unavailable to the Application Server 120 if the Connection Authenticator 130 terminates unexpectedly. The Database Server 150 will remain open as long as the Application Server's 120 connection with the Database Server 150 remains in place. But if the connection gets interrupted as well, it will not be allowed to resume unless the Connection Authenticator 130 process gets re-authenticated.

Note that whenever the Connection Authenticator's 130 TCP connection to the Database Server 150 is lost, the intrusion into the Application Server 120 should be presumed and appropriate action taken.

Program Product

The invention may be implemented, for example, by having the system for managing and authenticating database connections in a multi-tier environment as a software application (as an operating system element), a dedicated processor, or a dedicated processor with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method and direct a system for system for managing and authenticating database connections in a multi-tier environment.

This signal-bearing medium may comprise, for example, memory in a server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, or magneto-optical storage. As an example, the machine-readable instructions may comprise software object code, compiled from a language such as "C++", Java, Pascal, ADA, assembler, and the like.

Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A computer-implemented method for authenticating a database connection in a multi-tier environment, wherein the multi-tier environment is composed of two tiers that include a database server box and an application server box, wherein the database server box comprises a database server and a database gateway, and wherein the application server box comprises an application server and a connection authenticator, wherein said application server and said connection authenticator are connected to said database server over an IP network, said computer-implemented method comprising the steps of:
   a) establishing a first TCP connection from the database gateway to the connection authenticator in response to a system startup of the database gateway and in response to a user application being authenticated by an input of a password by a user, wherein the user application is a running process that requires data from the database server;
   b) matching the running process with a stored file from which the running process was started to ascertain that the process had been originated from the stored file and to confirm that the stored file has not been tampered with, wherein the running process is bound to the first TCP connection that couples the database gateway and the connection authenticator, and wherein the database gateway accepts a second TCP connection to the application server only from a predefined port number;
   c) authenticating the application server by the connection authenticator, wherein the connection authenticator verifies that the running process originated from the stored file, that the file had not been tampered with, and that the application server was successful in binding with the second TCP connection; and
   d) in response to the database gateway subsequently accepting the second TCP connection from the application server, authenticating the application server before allowing the routing of database requests and responses to and from the database server, wherein the database server remains coupled and available to the application server via the second TCP connection if the connection authenticator terminates, and wherein the database server remains open as long as the second TCP connection to the application server remains in place.

2. The computer-implemented method of claim 1, further comprising verifying that the application server is responding to status requests from the connection authenticator.

3. The computer-implemented method of claim 2, further comprising subsequently routing database requests and responses to and from the database server in response to verifying that the application server is responding to status requests from the connection authenticator.

4. The computer-implemented method of claim 1, further comprising:
   e) in response to the first TCP connection dropping, re-authenticating the connection authenticator by external means.

5. The computer-implemented method of claim 1, wherein the database server and the application server are coupled, the computer-implemented method further comprising:
   f) in response to operations of the connection authenticator terminating, maintaining a coupling between the database server and the application server.

6. A tangible storage medium on which is encoded a program product embodying a program code of computer readable instructions, wherein said tangible storage medium is a component of a device selected from a hard drive, a RAID array, a RAMAC, a magnetic data storage diskette, magnetic tape, digital optical tape, RAM, ROM, EPROM, EEPROM, flash memory and magneto-optical storage, and wherein said program code is executable by a digital processing apparatus to control a computer system having a database server and a database gateway; and an application server box having an application server and a connection authenticator, said application server and said connection authenticator connected to said database server over an IP network, said program product directing a method comprising the steps of:
   a) establishing a first TCP connection from the database gateway to the connection authenticator in response to a system startup of the database gateway and in response to a user application being authenticated by an input of a password by a user, wherein the user application is a running process that requires data from the database server;
   b) matching the running process with a stored file from which the running process was started to ascertain that the process had been originated from the stored file and to confirm that the stored file has not been tampered with, wherein the running process is bound to the first TCP connection that couples the database gateway and the connection authenticator, and wherein the database gateway accepts a second TCP connection to the application server only from a predefined port number;
   c) authenticating the application server by the connection authenticator, wherein the connection authenticator verifies that the running process originated from the stored file, that the file had not been tampered with, and that the application server was successful in binding with the second TCP connection;
   d) in response to the first TCP connection dropping, re-authenticating the connection authenticator by external means; and
   e) in response to the database gateway subsequently accepting the second TCP connection from the application server authenticating the application server before allowing the routing of database requests and responses to and from the database server, wherein the database server remains coupled and available to the application server via the second TCP connection if the connection authenticator terminates, and wherein the database server remains open as long as the second TCP to the application server remains in place.

7. The tangible storage medium of claim 6, wherein the database server and the application server are coupled, the method further comprising:
  in response to operations of the connection authenticator terminating, maintaining a coupling between the database server and the application server.

8. The tangible storage medium of claim 6, further comprising verifying that the application server is responding to status requests from the connection authenticator.

9. The tangible storage medium of claim 8, wherein the method further comprises subsequently routing database requests and responses to and from the database server after verifying that the application server is responding to status requests from the connection authenticator.

10. The tangible storage medium of claim 6, wherein the database gateway is separate and distinct from the connection authenticator, and wherein the method further comprises establishing the TCP connection from the database gateway to the separate and distinct connection authenticator.

11. A system for authenticating a database connection in a multi-tier environment, the system comprising a multi-tier environment that is composed of only two tiers, wherein the two tiers comprise:
  a database server box; and
  an application server box, wherein the database server box comprises a database server and a database gateway, and wherein the application server box comprises an application server and a connection authenticator, said application server and said connection authenticator connected to said database server over an IP network, said system executing instructions from a program product that, when executed, perform the steps of:
  a) establishing a first TCP connection from the database gateway to the connection authenticator in response to a system setup of the database gateway and in response to a user application being authenticated by an input of a password by a user, wherein the user application is a running process that requires data from the database server;
  b) matching the running process with a stored file from which the running process was started to ascertain that the process had been originated from the stored file and to confirm that the stored file has not been tampered with, wherein the running process is bound to the first TCP connection that couples the database gateway and the connection authenticator, and wherein the database gateway accepts a second TCP connection to the application server only from a predefined port number;
  c) authenticating the application server by the connection authenticator, wherein the connection authenticator verifies that the running process originated from the stored file, and that the file had not been tampered with;
  d) in response to the first TCP connection dropping, re-authenticating the connection authenticator by external means; and
  e) in response to the database gateway subsequently accepting the second TCP connection from the application server, authenticating the application server before allowing the routing of database requests and responses to and from the database server, wherein the database server remains coupled and available to the application server via the second TCP connection if the connection authenticator terminates, wherein the database server remains open as long as the second TCP connection to the application server remains in place.

12. The system of claim 11, wherein the database server and the application are coupled, the method further comprising:
  in response to operations of the connection authenticator terminating, maintaining a coupling between the database server and the application server.

13. The system of claim 11, further comprising verifying that the application server is responding to status requests from the connection authenticator.

14. system of claim 13, wherein the method further comprises subsequently routing database requests and responses to and from the database server after verifying that the application server is responding to status requests from the connection authenticator.

15. The system of claim 11, wherein the database gateway is separate and distinct from the connection authenticator, and wherein the method further comprises establishing the TCP connection from the database gateway to the separate and distinct connection authenticator.

16. The system of claim 11, wherein the database server box and the application server box are only coupled by the first TCP connection and the second TCP connection.

* * * * *